United States Patent [19]

Kaneko

[11] Patent Number: 5,330,253
[45] Date of Patent: Jul. 19, 1994

[54] MECHANISM FOR MODULATING HEIGHT OF LEGS OF CHAIR FOR SMALL CHILD

[75] Inventor: Tomihisa Kaneko, Tokyo, Japan
[73] Assignee: Combi Corporation, Tokyo, Japan
[21] Appl. No.: 132,272
[22] Filed: Oct. 6, 1993

[30] Foreign Application Priority Data

Oct. 16, 1992 [JP] Japan .............................. 4-078156[U]

[51] Int. Cl.$^5$ ................................................ A47C 3/34
[52] U.S. Cl. ............................ 297/344.15; 280/47.38; 248/423; 248/432; 297/19
[58] Field of Search ................ 297/19, 256.11, 344.12, 297/344.15; 248/157, 423, 432; 280/47.38

[56] References Cited

U.S. PATENT DOCUMENTS

| | | | |
|---|---|---|---|
| 1,324,013 | 12/1919 | Sambra | 297/344.15 X |
| 3,977,644 | 8/1976 | Sturhan | 246/423 X |
| 4,461,444 | 7/1984 | Grassl et al. | 297/344.15 X |
| 4,700,921 | 10/1987 | Holbrook | 297/344.15 X |

FOREIGN PATENT DOCUMENTS

| | | | |
|---|---|---|---|
| 2129678 | 5/1984 | United Kingdom | 297/344.15 |
| 13693 | 8/1990 | United Kingdom | 297/344.12 |

*Primary Examiner*—Peter R. Brown
*Attorney, Agent, or Firm*—Sughrue, Mion, Zinn, Macpeak & Seas

[57] ABSTRACT

A mechanism for modulating the height of a chair for a small child which is designed such that it can be easily manipulated to adjust the height, and substantially all of the moving parts of the mechanism are enclosed. The chair, having the leg height modulation mechanism, includes a pair of leg assemblies of adjustable height, and a body coupled thereto in a pivotable manner. The front and rear legs of each of the leg assemblies are crossed and pivotally coupled to each other at their midportions. The front leg of each assembly is pivotally coupled at its upper end to a forward end of a support member by a pin. The rear leg is pivotally coupled at its upper end to a rear end of a slider. The slider is fitted in a holder so that the slider can be caused to slide while being guided by a sliding guide opening of the holder. The holder has a nearly U-shaped cross section, and is secured in the support member. The lower end of the engagement pin of a stopper secured to the top of the holder is engaged in a selected one of fitting holes provided in the upper portion of the slider at prescribed intervals in the longitudinal direction thereof.

5 Claims, 4 Drawing Sheets

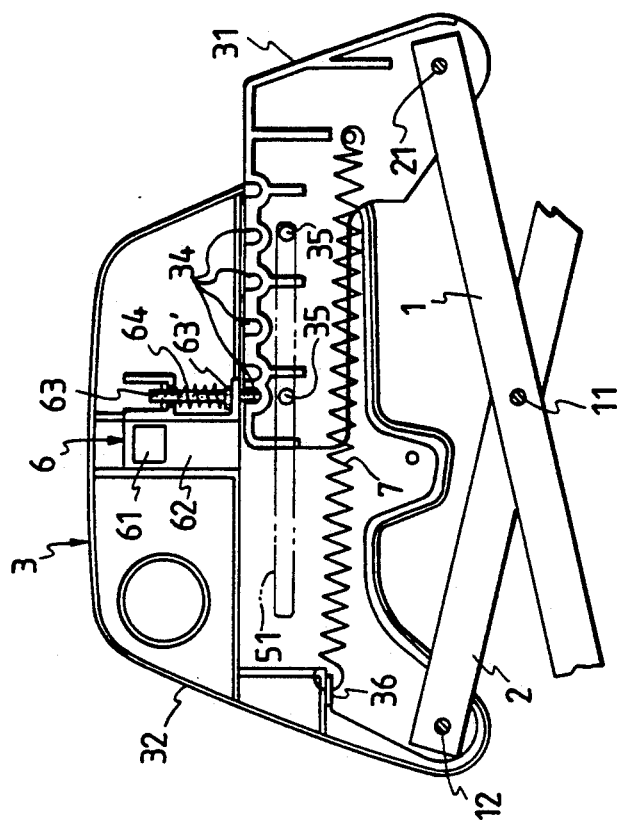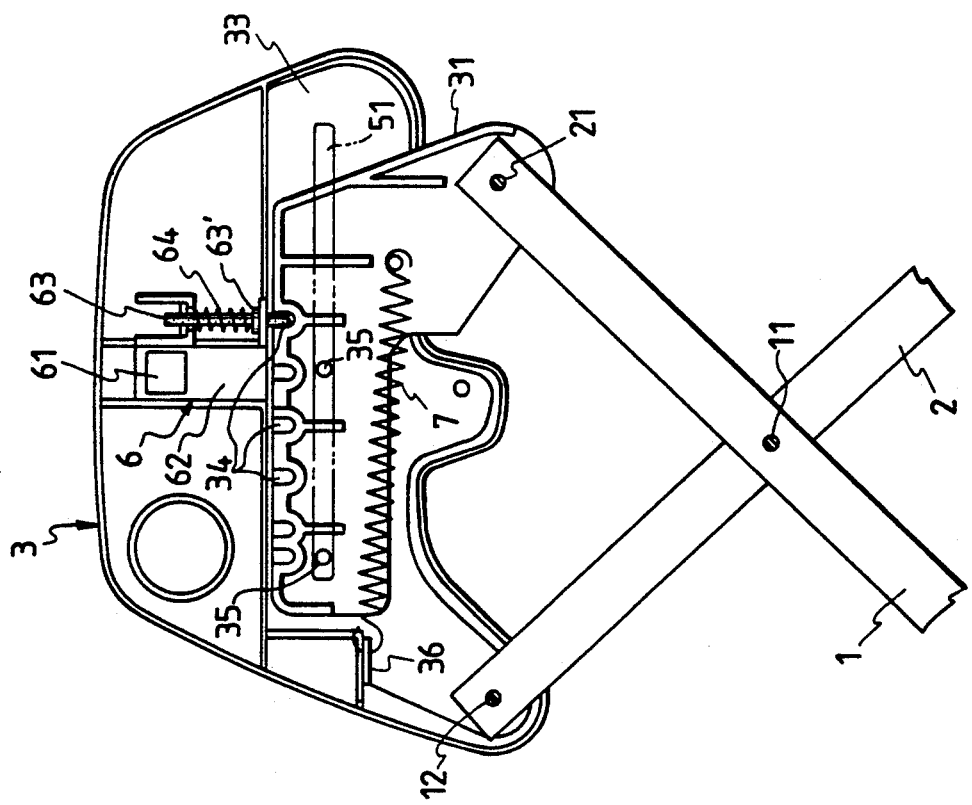

MECHANISM FOR MODULATING HEIGHT OF LEGS OF CHAIR FOR SMALL CHILD

BACKGROUND OF THE INVENTION

1. Field of the Invention

The present device relates to a chair for a small child, and more particularly relates to a mechanism for modulating the height of the legs of such a chair which support the body of the chair.

2. Background

In a conventional chair for a small child, the front and rear legs of each of the left and right leg assemblies supporting the body of the chair are crossed in an X-like arrangement and pivotally attached at their midportion. One of the legs is pivotally coupled at its upper end to the rear portion of the baby seat, the other leg is coupled at its upper end to a slider which is slidably disposed on the front side portion of the seat. To adjust the height of the seat, the upper ends of the front and the rear legs are moved toward or away from each other, as disclosed in the Japan Utility Model Application (OPI) No. 32148/92 (the term "OPI" as used herein means an "unexamined published application").

Such a conventional baby chair has several disadvantages. For example, since the slider of the leg height modulation mechanism is formed directly at the armrest of the chair, the constitution of the body of the chair is complicated. Further, since the slider is directly attached to the body of the chair and the leg is pivotally coupled to the slider, a swinging mechanism cannot be added to the chair. Further, much of the leg height modulation mechanism is exposed so that it can be easily touched by the child sitting in the chair. Therefore the child's hand may be injured if the child accidentally touches the mechanism.

SUMMARY OF THE INVENTION

The present device was made in order to solve the above-mentioned problems. Accordingly, it is an object of the present invention to provide a mechanism for modulating the height of a chair for a small child which is designed such that it can be easily manipulated to adjust the height, and substantially all of the moving parts of the mechanism are enclosed.

The chair having the leg height modulation mechanism provided in accordance with the present device includes a pair of leg assemblies of adjustable height, and a body coupled thereto in a rotatable manner. The mechanism is constituted as described below. The front and rear legs of each of the leg assemblies are crossed and pivotally coupled to each other at their midportions. The front leg of each assembly is pivotally coupled at its upper end to a forward end of a support member by a pin. The rear leg is pivotally coupled at its upper end to a rear end of a slider. The slider is fitted in a holder so that the slider can be caused to slide while being guided by a sliding guide opening of the holder. The holder has a nearly U-shaped cross section, and is secured in the support member. The lower end of the engagement pin of a stopper secured to the top of the holder is engaged in a selected one of fitting holes provided in the upper portion of the slider at prescribed intervals in the longitudinal direction thereof.

The above and other objects, features and advantages of the invention will become more apparent from the following detailed description of the invention when read in conjunction with the accompanying drawings.

BRIEF DESCRIPTION OF THE DRAWINGS

FIG. 4 is a partial view showing the interior portion of the support members where the support members are positioned in the maximum height position;

FIG. 5 is a partial view showing the interior of the support member where the support members are disposed in the minimum height position;

DETAILED DESCRIPTION OF THE PREFERRED EMBODIMENT

An embodiment of the present device is hereafter described with reference to the drawings attached hereto.

Figure 1:
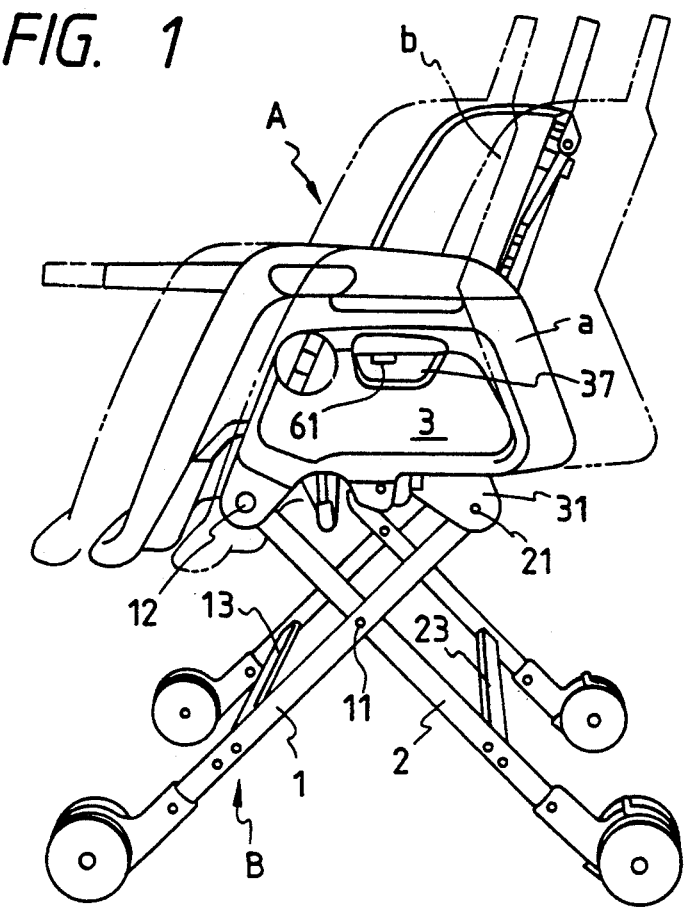
FIG. 1 is a side view of a chair for a small child showing a leg height modulation mechanism where the chair is disposed at the maximum height position.

The drawings show a chair for a small child. The chair includes a mechanism for modulating the chair height. Referring to FIG. 1, the chair includes two leg assemblies B, the height of which can be modulated by the mechanism, and a body A coupled to the assemblies at the upper ends thereof.

The body A is a conventional one, and includes a seat assembly a and a back assembly b pivotally coupled thereto so that the back assembly can be rotated.

Each of the leg assemblies B includes a front leg 1 and a rear leg 2 arranged in an X-like configuration with the midportions of the legs being pivotally coupled to each other at pin 11. The rear leg 2 is pivotally coupled at its upper end to the front of a support member 3 by a pin 12. The front leg 1 is pivotally coupled at its upper end to a slider 31 by a pin 21. The slider 31 is slidably supported by the support member 3.

Figure 2:
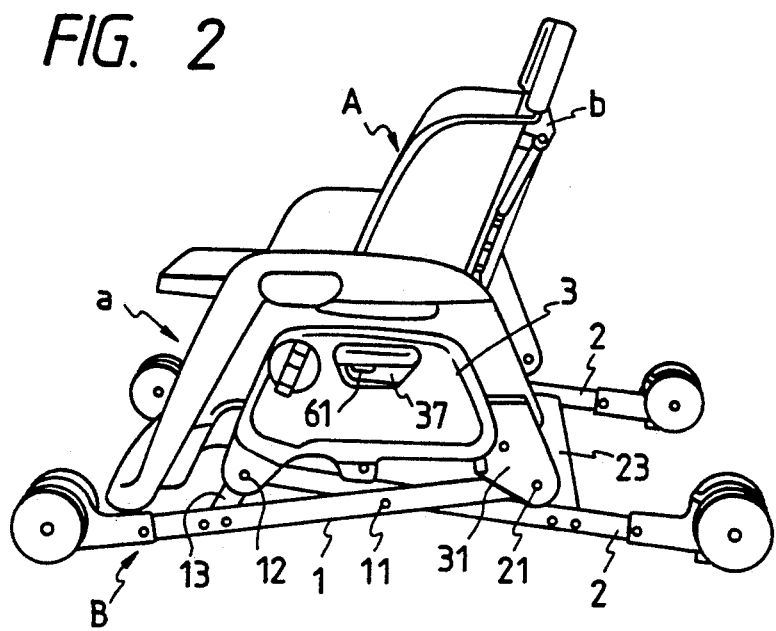
FIG. 2 is a side view of the chair disposed at the minimum height position.

The height of the leg assemblies B is modulated in such a manner that the height is increased by sliding the upper ends of the front and rear legs toward each other, as shown in FIG. 1, and is decreased by sliding the upper ends of the legs away from each other, as shown in FIG. 2.

Figure 3:
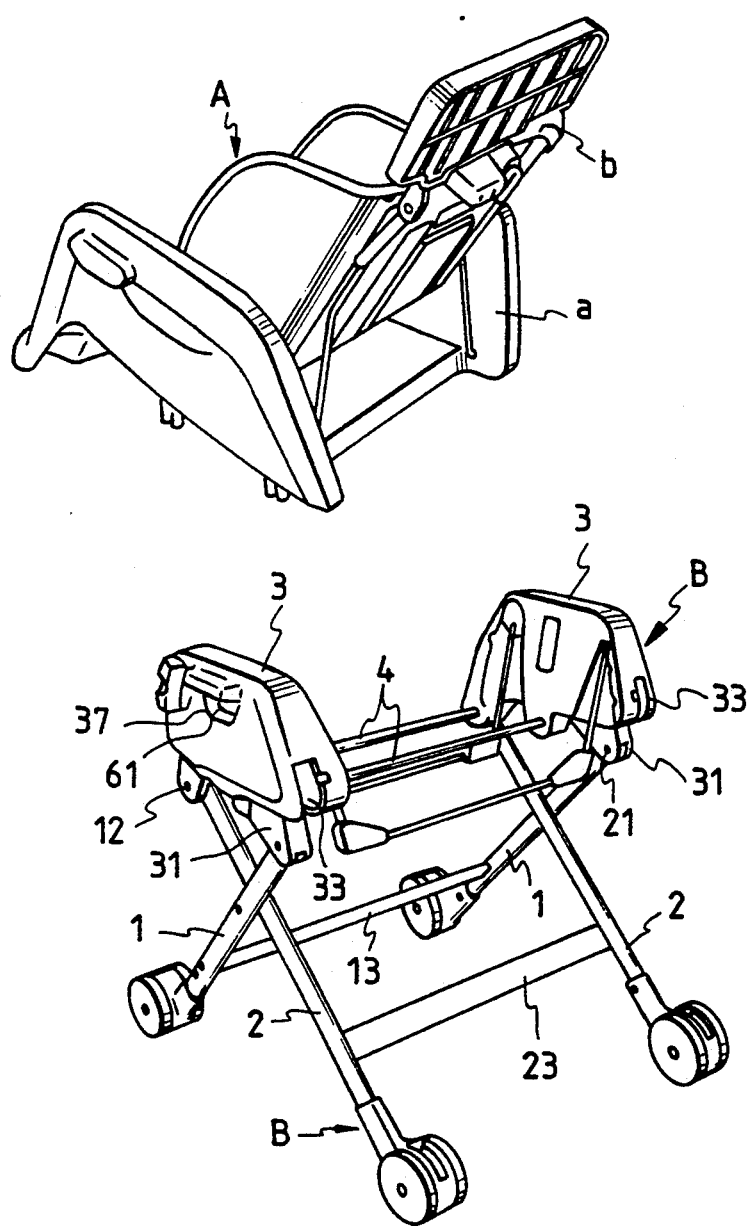
FIG. 3 is an exploded perspective view of the chair.
Figure 6:
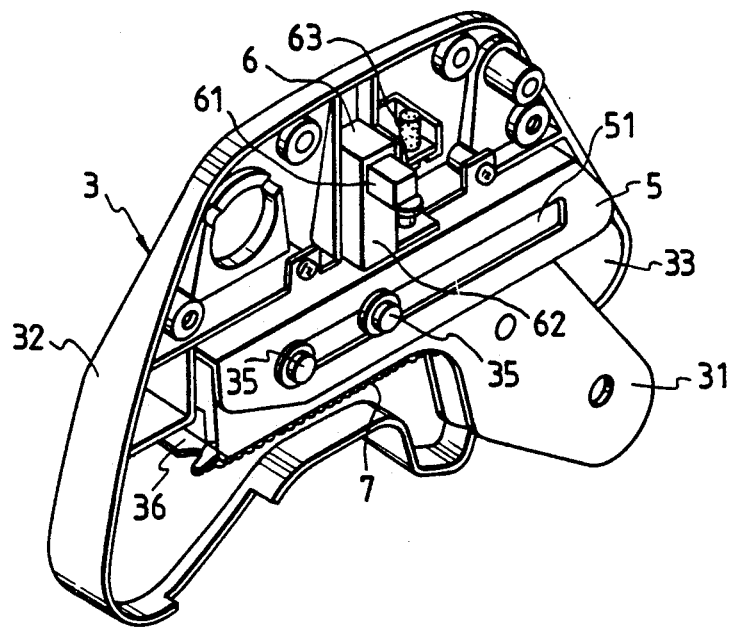
FIG. 6 is a partial perspective view of the interior of the support member at the maximum height position.
Figure 7:
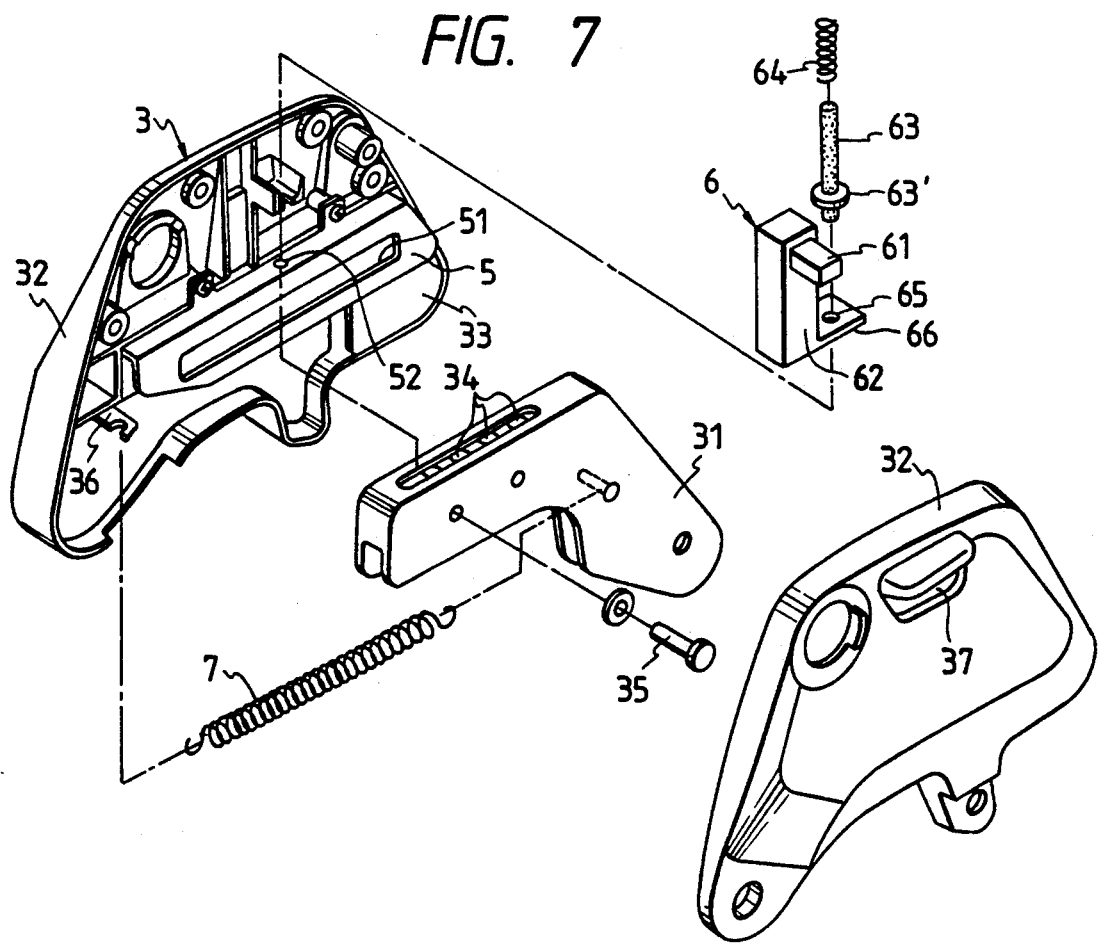
FIG. 7 is an exploded perspective view of the support member.

First coupling bars 4 are connected to the leg assemblies B so that the assemblies are set at a fixed distance from each other. Additionally, a second coupling bar 13 interconnects the front legs 1 and a third coupling bar 23 interconnects the rear legs 2. The leg assemblies B, the support members 3, and the coupling bars 4, 13 and 23 are firmly combined together, as shown in FIG. 3.

Each of the support members 3 includes a plate 32 where the peripheral portion of the plate is bent inwardly and has an opening 33 at the rear portion thereof for guiding slider 31. A holder 5 is secured in each of the support members 3 for slidably supporting the slider 31. Each holder has a nearly U-shaped cross section and guide groove 51 extending horizontally. Two guide pins 35 extend through the slider 31 and are fitted in the associated guide groove 51 to allow the slider to slide horizontally along the holder.

As described below, a stopper 6 is secured in each of the holders 5 and includes an engagement pin 63 for engaging a selected one of a plurality of fitting holes 34 provided in the upper portion of the slider at prescribed intervals to hold the slider in a desired position.

A tension spring 7 for urging the slider 31 in the forward direction is anchored at one end to the inner portion of the slider and at the other end to engagement hook 36 provided on the inside of the plate 32 near the front thereof. Therefore, the compressive force of the spring urges the slider further into the support member so to move the rear leg toward the front leg and, attendantly, increase the height of the leg assemblies B. Since the slide tends to move into the support member, the access to the slider is minimized so that it is less likely that a child's hand will be injured.

The stopper 6 is movably disposed above the holder 5, and includes a body 62 formed with a knob 61 at the upper end thereof, the engagement pin 63 fitted in the body so as to be vertically movable, and a spring 64. The lower end portion of the pin 63 extends through a hole 65 in the bottom flange 66 of the stopper body 62, through the fitting hole 52 of the upper portion of the holder 5, and is engaged in selected fitting hole 34 of the upper portion of the slider 31. The pin 63 has a flange 63' formed near the tip of the pin which abuts against bottom flange 66 of the body 62 so that the lower end portion of the pin, which projects down from the body, has a prescribed length, and so that the pin can be lifted with the flange. The spring 64 rests on the flange 63' and the appropriate inner portion of the plate 32, and urges the pin 63 downwardly so that it remains engaged in the selected fitting hole 34.

The knob 61 projects outwardly through the through hole 37 of the other plate 32, and is partially exposed outside the support member 3 so that the knob can be lifted from an external position to disengage the pin 63 from the fitting hole 34. When the knob 61 is no longer lifted, the pin 63 automatically returns to the engaged position with the fitting hole 34 due to the urging force of the spring 64.

The operation of the leg height modulation mechanism is now described. When the slider 31 is moved forwardly, the height of the leg assemblies B is maximized, as shown in FIGS. 1, 3 and 4. To decrease the height, the knob 61 of the stopper 6 is lifted against the urging force of the spring 64 to disengage the tip of the engagement pin 63 of the stopper from the fitting hole 34 of the upper portion of the slider 31, and the support member 3 or the chair body A disposed thereon is pushed down to cause the slider to slide rearwardly and project from the support member against the urging force of the tension spring 7 to thereby increase the distance between the upper ends of the front and the rear legs 1 and 2. The height of the chair is thus decreased. After the support member 3 or the chair body A is thus pushed down to a desired position, the knob 61 is released so that the engagement pin 63 is automatically and instantaneously moved down by the urging force of the spring 64 and engaged at the tip of the pin in another fitting hole 34 of the slider 31, as shown in FIGS. 2 and 5. To thereafter increase the height, the mechanism is operated in a reverse manner.

A leg height modulation mechanism is provided for a chair for a small child in accordance with the present device so that the height of the leg assemblies of the chair can be easily modulated by engaging the vertically movable engagement pins of stoppers in a selected fitting hole provided in the upper portions of sliders at prescribed intervals. Since the compressive force of the springs always urge the sliders toward the front leg the height of the leg assemblies can be easily and instantaneously increased by removing a force pushing down the body of the chair. Further, since the sliders are not exposed except at the rear portions thereof, injury to the child in the chair is prevented. Finally, since the springs always urge the engagement pins downwardly, the pins will not unexpectedly become disengaged from the fitting holes so that the slider will remain locked.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A mechanism for modulating the height of a chair for a small child, comprising:
   a seat portion including a support member on opposite lateral sides thereof;
   a pair of holders respectively provided inside said support members, each of said holders being substantially U-shaped defining a sliding cavity therein;
   a pair of sliders respectively slidably disposed in said cavities of said holders in forward and backward directions;
   a pair of leg assemblies respectively associated with said support members, each leg assembly including a front and a rear leg arranged in an X-like configuration and being pivotally secured to each other, said front leg being pivotally coupled at the upper end thereof to a front of an associated support member and said rear leg being pivotally coupled at the upper end thereof to an associated slider at the rear end thereof;
   locking means for locking each of said sliders in a selected position along each of said holders to thereby lock said chair at a predetermined height, said locking means including an engagement pin slidably secured to a top of said holder and a plurality of holes provided in each of said sliders at a predetermined interval extending in said forward and backward directions, said pin being engageable with one of said holes.

2. The mechanism according to claim 1, further comprising a pair of slider springs each connected at one end thereof to said associated support member and at the opposite end thereof said to said associated slider in such a manner that said springs respectively urge said sliders into said support members.

3. The mechanism of claim 2, wherein said slider spring urges said associated slider in said forward direction.

4. A mechanism according to claim 1, further comprising a pin spring associated with each of said engagement pins for urging said pins into engagement with one of said holes.

5. The mechanism of claim 1, wherein said lock means includes disengaging means for disengaging said pin from said one hole, at least a portion of said disengaging means protruding from said associated support member.

* * * * *